Feb. 21, 1950 P. ALEXANDER 2,498,147
COMPRESSED GAS CAPSULE WITH DISPENSING PUNCH
Filed March 22, 1946
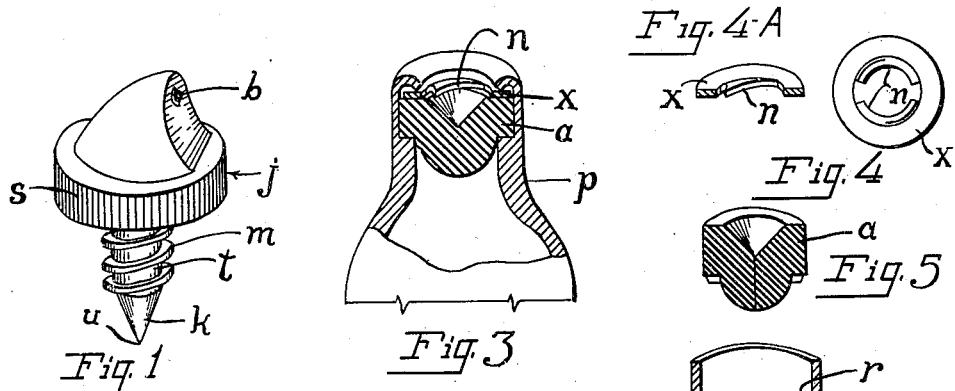
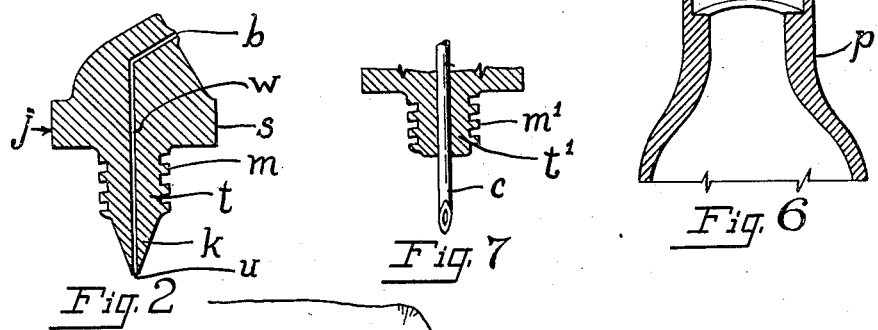
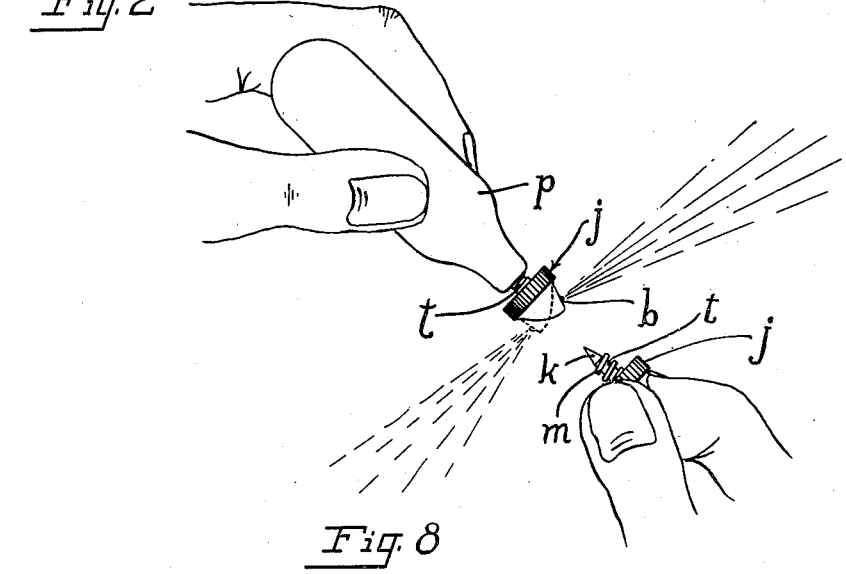
Philip Alexander
INVENTOR.
BY
Sawyer & Kennedy
ATTORNEYS Patented Feb. 21, 1950

2,498,147

UNITED STATES PATENT OFFICE 2,498,147

COMPRESSED GAS CAPSULE WITH DISPENSING PUNCH

Philip Alexander, New York, N. Y., assignor to Prel Inc., a corporation of New Jersey Application March 22, 1946, Serial No. 656,236

2 Claims. (Cl. 222—82)

1

This invention relates to a liquid dispensing device, and more particularly to a device for spraying, atomizing or dispensing liquids under pressure from enclosed vessels or capsules.

Many products, such as perfume, lubricants, lacquers, medicines, fumigants and insecticides are marketed in liquid form, to be used in an atomizer or spray device. These may be packaged in small vessels or capsules in which the liquid, together with a compressed gas, is sealed. The gas provides a propellant when the container is opened.

Even when purchased in quite small containers, often it is desired to use only a small portion of the contents at one time by reason of the qualities of the liquid and the particular uses to which it is to be put. A purpose of the present invention is the provision of a container and dispenser for use therewith combining an inexpensive, handy package that is small in size and a dispenser that may be used with such container and reused, as each individual container is emptied, with a new charged container.

A further object is the provision of such a dispenser and container combination wherein the entire contents of a container need not be expended at one time, but may be used at intervals over a period of time, as needed, without wasting any of the remaining contents of the container or dissipating the propellent pressure.

It is also an object of this invention to provide a dispensing device having a discharge passage and orifice of such inside diameter as to provide the desired atomization or spraying, depending upon the viscosity of the fluid to be dispensed and the pressure of the propellant within the container.

Still another object is to provide a dispensing device that is simple and positive in operation, small in size, inexpensive to manufacture, easy to handle and practically indestructible.

With these and other objects in view, as may appear from the following specification, the invention consists of various features of construction and combinations of parts, as described in connection with the accompanying drawings, illustrating a dispensing unit embodying the invention in a preferred form, the features forming the invention being specifically pointed out in the appended claims.

In the drawings:

Figure 1 is a perspective view of a dispensing device embodying the features of the present invention.

Figure 2 is a cross-section through the device illustrated in Figure 1.

Figure 3 is a cross-section through the neck portion of a container adapted for use with the dispensing device described herein.

Figures 4 and 4A are respectively a top plan

2 view, and a cross-section therethrough, of a washer used for adapting the container for use with the dispensing device.

Figure 5 is a cross-section through the sealing member embodied in said container.

Figure 6 is a fragmentary section, prior to assembly, of a container adapted for use with the present invention.

Figure 7 is a fragmentary section of a modified form of dispensing device embodying the features of the present invention.

Figure 8 is a composite view showing the method of using the dispensing device embodying the present invention.

Referring more particularly to the drawings, Figure 1 illustrates a dispenser for use with a sealed capsule or container having a liquid chemical or liquid gas therein together with a gas to provide propelling pressure upon piercing of the capsule. The unit $j$ in Figure 1 may be made of a plastic, metal or other material suitable therefor, and the unit comprises a main section $s$, which may be of any desired shape, although it is shown as substantially circular in form. The sides of the section $s$ may be knurled or milled to provide a better gripping surface.

Extending down from the lower surface of this circular section $s$ is a small tubular extension $t$ having threads $m$ formed on its outer surface. The end of this tubular extension $t$ is formed in a sharp point $k$ at the apex of which is an inlet $u$ for a passage $w$ extending upward through the tubular extension. A dome shaped projection is formed on the upper surface of the section $s$, having in its surface an outlet or orifice $b$ for the passage $w$. The shape of the upper surface may be modified in any suitable manner without departing from the spirit of the present invention.

The passage $w$ is shown as having an angle therein, so that the discharge stream proceeds at an angle from the axis of the dispensing unit and the associated container. However the passage may be straight, if desired, to project the discharge spray substantially in line with the axis of the container.

The container or capsule $p$ for the liquid chemical or gas, illustrated in Figure 3, may be of any desired shape or size, so long as it is adaptable for use with the soft resilient plastic sealing member or plug $a$, which is of rubber or similar suitable material. The sealing element is fully described in my copending applications of even date herewith and is inserted within the neck of the container $p$ within a recess $r$ formed therein, being compressed against a seat or shoulder formed at the bottom of the recess. The sealing member or plug $a$ is concave in shape, whereby the pressure within the container $p$, exerting an upward force against its lower surface, improves the sealing qualities thereof and enhances its resealing qualities. The sealing element is adapted to reseal itself whenever the extension $t$ is withdrawn.

A washer member $x$ (see Figure 4) of metal or other desirable material, is inserted within the neck of the container $p$, resting on top of the sealing element $a$, and both are held securely in place and are downwardly compressed by the crimped or turned over wall of the neck of the container $p$, thus forcing the sealing element into sealing relation with the inside of the container neck.

This washer $x$ is a substantially flat circular member having mutilated threads $n$ formed on its inner edge for cooperation with the threads $m$ formed on the tubular extension $t$ of the unit $j$, as will be described hereinafter.

Figures 5 and 6 illustrate in detail the construction of the sealing member $a$ and the container $p$, showing clearly the recess $r$ formed in the neck of the container which receives the sealing member $a$ and the washer $x$. After these two are inserted in the recess and the container $p$ is filled or charged, the upper edges of the walls of the recess $r$ are turned inwardly against the upper surface of the washer $x$, compressing it downward against the sealing member $a$, as shown in Figure 3. This compressing action causes the sealing member to be crushed against the shoulder formed in the neck of the container $p$ at the bottom of the recess and further causes it to spread against the walls of the recess, thoroughly sealing the opening in the container.

When it is desired to use the contents of the capsule or container $p$, the unit $j$ is grasped in the fingers of the user, as illustrated in Figure 8, and the point $k$ inserted through the opening in the washer $x$ and into the concavity in the surface of the sealing washer $a$. The threads $m$ on the dispensing unit $j$ engage the threads $n$ formed on the washer $x$, and as the unit $j$ is turned or rotated, the point $k$ is forced against the surface of the sealing plug and penetrates it. Turning of the unit $j$ is continued until the point $k$ of the tube or extension $t$ has passed entirely through the body of the sealing member $a$ and has emerged into the interior of the container $p$, whereupon the pressure of the propellant within the capsule or container $p$ will force the fluid therein upward through the passage $w$ and from the orifice $b$ in the form of a jet or spray, as indicated in Figure 8.

When the desired portion of the contents of the capsule or container $p$ have been used, the unit $j$ may be withdrawn therefrom by turning the unit in a reverse direction and unscrewing the extension $t$ from the washer $x$. As the point $k$ of the extension $t$ is withdrawn from the sealing member $a$, the puncture in the latter, due to the specific construction and qualities of the sealing member as disclosed in my copending application of even date, will be sealed and the remainder of the contents of the container preserved for future use.

If desired, the sealing member $a$ may be originally formed with a puncture therein (as see Figure 5) which will not impair its sealing qualities, since such puncture will seal itself at the time of the original insertion and compression of the member within the opening of the container, when the latter is filled or charged. In the usual construction such prepuncturing is not necessary, since the tubular extension $t$ and the threads formed thereon would ordinarily be quite small in cross-section. However, if a particularly large passage and orifice are desired, making it necessary to use a larger extension and increasing the cross-section thereof, the larger point $k$ and threads $m$ may "chew" or otherwise disrupt the sealing member during penetration to such an extent as to impair its resealing qualities, in which case the prepuncturing of the member $a$ will be desirable, allowing the extension $t$ to work therethrough without affecting the walls of the puncture to any considerable extent, but merely expanding them.

As illustrated in Figure 8, the direction of the discharge spray or jet with relation to the container may be regulated by turning the unit $j$ a partial turn, or by turning the entire device, as desired.

When it is desired to use more of the contents of a capsule which has been resealed by withdrawal of the dispensing unit $j$, the dispensing unit is simply reinserted or threaded into the washer $x$, entering the same spot or puncture created in the sealing member $a$ when the container was first used. The container may be reopened as many times as desired, until its entire contents have been exhausted, without any loss or wastage of its contents or waste of the pressure of the propellant therein prior to said exhaustion, by reason of the type of sealing member used and its cooperation with the dispensing device disclosed herein.

A modified form of construction for the unit is illustrated in Figure 7, wherein the shape of the unit is substantially the same as in the form discussed above. However, a tube $c$ of metal or other suitable material may be embedded in the body of the unit at the time of its manufacture, replacing or supplementing the passage or duct $w$. This tube $c$ extends downwardly through the extension $t'$ on the surface of which the threads $m'$ are formed. The tube $c$ extends below the end of the extension $t'$ a short distance, terminating in a sharp point for piercing the sealing member $a$. This modified form of the device is substantially the same as the form described above, and operates in the same manner, differing therefrom only in that the extension of the tube $c$ pierces the washer $a$ rather than the point $k$ of the tubular extension $t$ of the primary form.

What is claimed is:

1. In a dispensing device for liquids under pressure, and in combination, a container having a discharge opening, a soft plastic resilient sealing member in said opening, a washer in said opening having a mutilated screw thread formed on its inner edge, a dispensing body, a tubular extension attached to the lower surface of said body, threads formed on the peripheral surface of said extension adapted to cooperate with said washer to allow insertion of said extension through said washer and said sealing member, said extension having a sharp edge on its end for piercing said sealing member, and said extension and body having a passage for the discharge of liquid from said container.

2. In a dispensing device for liquids under pressure, and in combination, a container having a neck, and an annular seat therein, a soft resilient plastic sealing element within said neck and abutting against said seat, and a washer outside said sealing element in compressing relation thereto and having a mutilated screw thread formed on its inner edge, the rim of the said neck being turned over the said washer to compress the said sealing element into sealing relation with the inside of said neck.

PHILIP ALEXANDER.

REFERENCES CITED

The following references are of record in the file of this patent:

UNITED STATES PATENTS

| Number | Name | Date |
|---|---|---|
| 520,240 | Merrick | May 22, 1894 |
| 1,585,695 | Schroeder | May 25, 1926 |
| 1,641,457 | Romer | Sept. 6, 1927 |
| 1,795,560 | Johnston | Mar. 10, 1931 |
| 2,003,562 | Stuart | June 4, 1935 |
| 2,220,146 | Curry | Nov. 5, 1940 |
| 2,361,705 | Patterson | Oct. 31, 1944 |
| 2,450,461 | Wallach | Oct. 5, 1948 |

FOREIGN PATENTS

| Number | Country | Date |
|---|---|---|
| 385,380 | Great Britain | Dec. 29, 1932 |